3,657,205
PREPARATION OF HIGH 1,4-POLYPENTADIENES
Morford C. Throckmorton, Akron, Ohio, assignor to The Goodyear Tire & Rubber Company, Akron, Ohio
No Drawing. Filed Sept. 3, 1970, Ser. No. 69,468
Int. Cl. C08d *1/14, 3/08, 3/12*
U.S. Cl. 260—82.1          10 Claims

ABSTRACT OF THE DISCLOSURE

There is disclosed a process for homopolymerizing at least one diolefin of the general formula:

$$H_2C=C-C=CH-R$$
$$\phantom{H_2C=C}|\phantom{-C}|$$
$$\phantom{H_2C=}Y_1\phantom{C}Y_2$$

wherein $Y_1$ and $Y_2$ are selected from the group consisting of hydrogen and alkyl radicals having from 1 to 4 carbon atoms and R is selected from alkyl (including cycloalkyl), alkaryl, arylalkyl and aryl groups, containing from 1 to 8 carbon atoms, or copolymerizing with at least one diolefin of the general formula $$H_2C=C-C=CH_2$$
$$\phantom{H_2C=C}|\phantom{-C}|$$
$$\phantom{H_2C=}Y_1\phantom{C}Y_2$$

wherein $Y_1$ and $Y_2$ are selected from the group consisting of hydrogen and alkyl radicals having from 1 to 4 carbon atoms, by contact, under solution polymerization conditions with a catalyst comprising (1) an organoaluminum compound from the class consisting of triorganoaluminum and diorganoaluminum hydride compounds, (2) an organometallic compound, the metal ion of which is selected from the class consisting of metals of Group III–B of the Periodic System.

---

This invention is directed to a method for polymerizing certain diolefins to homopolymers which contain a very large proportion of 1,4-structure. The group of diolefins to which this invention is directed is defined by the general formula:

$$H_2C=C-C=CH-R$$
$$\phantom{H_2C=C}|\phantom{-C}|$$
$$\phantom{H_2C=}Y_1\phantom{C}Y_2$$

wherein R is selected from alkyl (including cycloalkyl), alkaryl or aryl group containing from one to eight carbon atoms, and wherein $Y_1$ and $Y_2$ represent either hydrogen or alkyl radicals having from 1 to 4 carbon atoms and may be the same or different radicals.

Thus, this invention relates to the stereospecific polymerization of compounds represented by but not limited to piperylene or 1,3-pentadiene, 2-methyl-1,3-pentadiene, 4-butyl-1,3-pentadiene, 2,3-dimethyl-1,3-pentadiene, 2-ethyl-1,3-pentadiene, 2,3-dibutyl-1,3-pentadiene, 1,3-hexadiene, 1,3-octadiene, 1-phenyl-1,3-butadiene and other such compounds with the proper substituents of $Y_1$, $Y_2$ and R as indicated above.

The homopolymers of such diolefins when produced in accordance with this invention contain more than 95 percent of their microstructure in the 1,4 configuration. Furthermore, in these homopolymers the orientation between cis 1,4 and trans 1,4 contents appear to approach equality. Such homopolymers are non-crystalline at ambient temperatures.

This invention is also directed to a method for polymerizing certain diolefins with certain other diolefins to form copolymers. For instance, the diolefins defined by the formula:

$$H_2C=C-C=CH-R$$
$$\phantom{H_2C=C}|\phantom{-C}|$$
$$\phantom{H_2C=}Y_1\phantom{C}Y_2$$

wherein R is selected from alkyl (including cycloalkyl), alkaryl or aryl group containing from one to eight carbon atoms, and where $Y_1$ and $Y_2$ represent either hydrogen or alkyl radicals having from 1 to 4 carbon atoms and may be the same or different radicals, may be copolymerized with conjugated diolefins of the formula:

$$H_2C=C-C=CH_2$$
$$\phantom{H_2C=C}|\phantom{-C}|$$
$$\phantom{H_2C=}Y_1\phantom{C}Y_2$$

where $Y_1$ and $Y_2$ represent either hydrogen or alkyl radicals having from 1 to 4 carbon atoms.

Thus, this invention relates to the stereospecific copolymerization of compounds represented by, but not limited to, piperylene or 1,3-pentadiene, 2-methyl-1,3-pentadiene, 4-butyl-1,3-pentadiene, 2,3-dimethyl-1,3-pentadiene, 1,3-hexadiene, 1,3-octadiene, 1-phenyl-1,3-butadiene, 2,3-dibutyl-1,3-pentadiene and 2-ethyl-1,3-pentadiene with other conjugated diolefins, such as 1,3-butadiene, 2-methyl-1,3-butadiene or isoprene, 2-ethyl-1,3-butadiene and the like.

The copolymers of such diolefins when produced in accordance with this invention contain more than 95 percent of their microstructure in a 1,4 configuration. The portion of the copolymer resulting from the conjugated diolefins having only four carbons in the chain are of high cis 1,4 configuration. The portion of the copolymer resulting from the diolefins having the formula:

$$H_2C=C-C=CH-R$$
$$\phantom{H_2C=C}|\phantom{-C}|$$
$$\phantom{H_2C=}Y_1\phantom{C}Y_2$$

are in the 1,4 configuration with the orientation between the cis 1,4 and trans 1,4 content approaching equality. Such copolymers are not crystalline at ambient temperatures.

This invention is also directed to a catalyst system useful for the preparation of such polymers.

The catalytic polymerization of piperylene, for instance, by either a titanium catalyst system (Group IV in the Periodic Table) or a cobalt catalyst system (Group VIII in the Periodic Table) is well known in the art. However, the alkylaluminum/titanium alkoxide catalyst system when employed to polymerize piperylene produces a moderately high (greater than 75 percent) cis 1,4 structure, about 10 to 13 percent trans 1,4 structure and 5 to 8 percent 3,4 polypiperylene. On the other hand, when piperylene is polymerized by a catalyst system such as alkylaluminum chloride/cobalt chloride, there is produced a polypiperylene containing a very high (about 97 percent) 1,2 structure; if water or thiophene, for instance, is present with this aluminum/cobalt catalyst system, the resulting polypiperylene analysis would be about 80 percent cis 1,4 and about 20 percent 1,2 polypiperylene. In any event, all three of these polypiperylenes made with known prior art catalyst systems are relatively crystalline and non-elastomeric at room temperature.

It is also known that a catalyst comprising a cerium compound plus a halide containing catalyst will polymerize butadiene or isoprene to high (about 90 percent) cis 1,4 content polymer.

It should be understood that none of these polymers which are known to the art are similar to the polymers of the present invention in which the cis 1,4 content and the trans 1,4 content approach equality and the total 1,4 orientation is greater than 95 percent. Thus, it is believed that this approximately equal and random division of the cis 1,4 and trans 1,4 content provides a means of obtaining novel and useful synthetic rubbers.

Thus, according to the invention, at least one diolefin of the general formula:

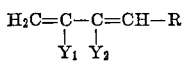

wherein $Y_1$ and $Y_2$ are selected from the group consisting of hydrogen and alkyl radicals having from 1 to 4 carbon atoms and R is selected from alkyl (including cycloalkyl), alkaryl, arylalkyl and aryl groups, containing from 2 to 8 crbon atoms, is homoploymerized or copolymerized with at least one diolefin of the general formula:

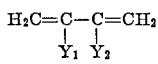

wherein $Y_1$ and $Y_2$ are selected from the group consisting of hydrogen and alkyl radicals having from 1 to 4 carbon atoms, by contact, under solution polymerization conditions, with a catalyst comprising (1) an organoaluminimum compound from the class consisting of triorganoaluminum and diorganoaluminum hydride compounds, (2) an organometallic compound, the metal ion of which is selected from the class consisting of metals of Groups III–B of the Periodic System, and (3) a compound providing a halide ion.

By the terms "triorganoaluminum" and "diorganoaluminum hydride" is meant any compound responding to the formula:

in which $R_1$ is selected from the group consisting of alkyl (including cycloalkyl), alkoxy, aryl, alkaryl, arylalkyl radicals and hydrogen; $R_2$ and $R_3$ being selected from the group of alkyl (including cycloalkyl), aryl, alkaryl and arylalkyl radicals. Representative of the compounds responding to the formula set forth above are: diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminum hydride, p-tolyl-n-propylaluminum hydride, p-tolylisopropylaluminum hydride, benzylethylaluminum hydride, benzyl-n-propylaluminum hydride, and benzylisopropylaluminum hydride and other organoaluminum hydrides. Also included are diethylethoxyaluminum and dipropylethoxyaluminum. Also included are trimethylaluminum, triethylaluminum, tri-n-propylaluminum, triisopropylaluminum, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum and other triorganoaluminum compounds.

The second essential component of the catalyst system is an organometallic compound of metals of Group III–B of the Periodic System. The metal ion forms the central core or atom to which two or more ligand-type groups or atoms are joined. The resulting complex compound may be known as a coordination-type compound. For the present invention, the most useful of these coordination compounds comprise metals of Group III–B and ligands represented by organic groups containing from 1 to 20 carbon atoms. These compounds may be symbolically represented as $ML_n$ wherein M represents the metal ion of Group III–B and L represents the organic ligand and "$n$" is an integer of 2 or greater.

Representative Group III–B metals useful in the invention include scandium, yttrium, lanthanum, actinium, cerium, praseodymium, neodymium, promethium, samarium, europium, gadolinium, terbium, dysprosium, holmium, erbium, thulium, ytterbium and lutetium. Of these, cerium, lanthanum and neodymium are preferred.

The organic portion of the coordination compound includes organic-type ligands containing from 1 to 20 carbon atoms. Representative but not exclusive of these organic type ligands are acetic acid, propionic acid, butyric acid, trimethyl acetic acid, 2-ethylhexanoic acid, 2,4-pentanedione, 3-methyl-2,4-pentanedione, 1-ethoxy-1,3-butanedione, 1,3-diethoxy-1,3-propanedione, 1,3-diphenyl-1,3-propanedione, substituted naphthenic carboxylic acids and the like. Also useful are ligands, such as 2-hydroxyquinoline and the like, o-hydroxyaldehydes, such as salicylaldehyde, and 2-hydroxy-1-naphthaldehyde and the like, o-hydroxyphenones, such as 2-hydroxyacetophenone, 2-hydroxybenzophenone, and the like, dicarboxylic acids, such as oxalic, maleic and o-phthalic and the like, hydroxyesters such as ethyl salicylate, phenyl salicylate and the like, phenolic ethers, such as o-hydroxyanisole and the like, and amino-type compounds, such as o-aminophenol and salicylaldimines and the like.

Representative organometallic compounds of the Group III–B metals which may be useful in this invention include cerium acetylacetonate, cerium naphthenate, cerium octanoate, tris - salicylaldehyde cerium, cerium tris(8 - hydroxyquinolate), cerium oxalate, cerium ethyl salicylate, lanthanum tris(8-hydroxyquinolate), lanthanum naphthenate, lanthanum octanoate, neodymium acetylacetonate, neodymium octanoate, yttrium acetylacetonate, yttrium octanoate and dysprosium octanoate.

For a high degree of polymerization activity, it is believed that the organometallic coordination compound should be soluble in either the solvent or the monomer or the mixture of solvent and monomers.

The third or (C) catalyst component of this invention is a compound containing a halide ion. Representative of the halide ions which are within the scope of this invention include bromide ion, chloride ion, fluoride ion and iodide ion and the presence of one or more of these ions is essential in the catalyst system. These halide ions may be introduced as (1) hydrogen halides; (2) alkyl, aryl, alkaryl, aralkyl and cycloalkyl metal halides wherein the metal is selected from Groups II, III–A and IV–A of the Periodic Table; (3) halides of metals of Groups III, IV, V, VI–B and VIII of the Periodic Table and (4) organometallic halides wherein the metal of the organometallic halide is selected from the group consisting of metals of Group III–B of the Periodic Table having atomic numbers of 21, 39 and 57 through 71 inclusive.

Representative examples of such compounds containing a halide ion include hydrogen bromide, hydrogen chloride and hydrogen iodide; ethylmagnesium bromide, butylmagnesium bromide, phenylmagnesium bromide, methylmagnesium chloride, butylmagnesium chloride, ethylmagnesium iodide, phenylmagnesium iodide, diethylaluminum bromide, diisobutylaluminum bromide, methylaluminum sesquibromide, diethylaluminum chloride, ethylaluminum dichloride, ethylaluminum sesquichloride, diisobutylaluminum chloride, isobutylaluminum dichloride, dihexylaluminum chloride, cyclohexylaluminum dichloride, phenylaluminum dichloride, didodecylaluminum chloride, diethylaluminum fluoride, dibutylaluminum fluoride, diethylaluminum iodide, dibutylaluminum iodide, phenylaluminum diiodide, trimethyltin bromide, triethyltin chloride, dibutyltin dichloride, butyltin trichloride, diphenyltin dichloride, tributyltin iodide and the like; aluminum bromide, aluminum chloride, aluminum iodide, antimony pentachloride, antimony trichloride, boron tribromide, boron trichloride, ferric chloride, gallium trichloride, molybdenum pentachloride, phosphorus tribromide, phosphorus pentachloride, stannic chloride, titanium tetrachloride, titanium tetraiodide, tungsten hexachloride and the like and t-butylsalicylaldehydocerium(III)chloride, salicylaldehydocerium(III)chloride, 5 - cyclohexylsalicylaldehydocerium(III)chloride, 2-acetylphenolatocerium(III) chloride, oxalatocerium(III)chloride, oxalatocerium(III) bromide and the like. The halide ions in the third or (C) component of this invention are labile halide ions.

Also employed may be a compound containing a fluoride ion, representative of which are hydrogen fluoride, ethylmagnesium fluoride, phenylmagnesium fluoride, diisobutylaluminum fluoride, ethylaluminum sesquifluoride, boron trifluoride, aluminum trifluoride, triethyltin fluoride, titanium tetrafluoride, tungsten hexafluoride and the like.

The mole ratio between the organoaluminum compound and the Group III–B metal compound (Al/III) should be between about 2/1 and 250/1, with a more preferred ratio being between about 4/1 and 100/1. When the halide ion is chloride, bromide or iodide, the mole ratio of halogen atom to Group III–B metal (H/III) should be between about 0.5/1 and 4/1, with the more preferred ratio being between about 1.2/1 and 3/1. When the halogen is fluorine, the fluorine to Group III–B metal mole ratio (F/III) should be within the range of about 15/1 to about 80/1, and preferably between about 20/1 and 70/1.

The different trialkylaluminum and dialkylaluminum hydride compounds have various optimum catalyst levels. Although there is no lower limit for these compounds, sufficient compound should be used to promote polymerization. Although there is no upper limit on the amount of alkylaluminum and alkylaluminum hydride catalyst used, a large excess not only results in polymers with low dilute solution viscosities (DSV) but also results in economic waste. It has been found that polymerization will occur when the alkylaluminum or alkylaluminum hydride compound varies between 1 and 50 millimoles of alkylaluminum or alkylaluminum hydride compound per 100 grams of monomer used, with a preferred level being between 2 and 25 millimoles per 100 grams of monomer.

The catalyst levels of the Group III–B metal may vary over a rather wide range. Although no lower level is specified, a sufficient amount of Group III–B metal must be used to effect a polymerization to a high 1,4 polymer configuration. Although no upper limit is specified, a large amount of the Group III–B metal catalyst is undesirable economically and also due to the relatively high catalyst residue which would be in the polymer. It has been found that polymerization will occur when the catalyst level of the Group III–B metal varies between 0.05 and 2.0 millimoles of Group III–B metal per 100 grams of monomer. A preferred ratio is between 0.15 and 0.5 millimole of Group III–B metal per 100 grams of monomer.

The three catalyst components may be charged to the polymerization system as separate catalyst components in either a stepwise or a simultaneous manner. Thus, the three catalyst components may be added separately to the premix by first introducing alkylaluminum or alkylaluminum hydride compound and then the Group III–B metal chelate or ligand complex and then adding the compound containing the halide ion. Any other order of addition of the separate catalyst components may be used and polymerization to solid, high 1,4 elastomers will still be achieved. The catalyst may also be "preformed" outside the polymerization system whereby all of the catalyst components are mixed either in the presence of a small amount of conjugated diolefin or in the absence of the monomer to be polymerized, either with or without an inert diluent and the complete catalyst then added to the polymerization system. The preformed catalysts may be permitted to stand for a few hours to "age" before using. The catalysts preformed in the presence of conjugated diolefins generally are more active than the in situ catalysts.

The concentration of the total catalyst system employed, of course, depends on factors such as purity of the system, polymerization rate desired, temperature and other factors, therefore, specific concentrations cannot be set forth except to say that catalytic amounts are used. Some specific concentrations and ratios which produce elastomers having desirable properties will be illustrated in the examples given herein to explain the teachings of this invention.

In general, the polymerizations of this invention are carried out in any inert solvent, and thus, are solution polymerizations. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic and cycloaliphatic hydrocarbons, representative of which are pentane, hexane, heptane, toluene, benzene, cyclohexane and the like. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent, such as butane or pentane, in which the polymer formed is insoluble. It should be understood, however, that it is not intended to exclude bulk polymerizations from the scope of this application. The polymerization may be continuous or batch type.

It is usually desirable to conduct the polymerization of this invention employing air-free and moisture-free techniques.

The temperatures employed in the practice of this invention have not been found to be critical and may vary from a low temperature such as −10° C. or below up to high temperatures of 100° C. or higher. However, a more desirable temperature range is between about 0° C. and about 90° C. Ambient pressures are usually used but higher or lower pressures may be employed.

The practice of this invention is further illustrated by reference to the following examples which are intended to be representative rather than restrictive of the scope of this invention.

EXAMPLE I

A purified piperylene in hexane solution containing 132 grams of piperylene per liter of solution was charged to 4-ounce bottles. Nitrogen was flushed over the surface of this premix while the catalyst was charged in situ in the amounts shown in the table below. The catalyst employed was triisobutylaluminum (TIBAL), cerium octanoate (CeOct) and ethylaluminum dichloride (EADC). The sealed bottles were tumbled end-over-end for 20 hours in a water bath maintained at 50° C. The polymerizations were deactivated by the addition to the system of a suitable stopping agent and an antioxidant. Table I contains the catalyst components charged in millimoles per 100 grams of piperylene, the polymer yields in 20 hours, the dilute solution viscosities, and in certain cases, the microstructure of the polymer.

TABLE 1.—PREPARATION AND PROPERTIES OF POLYPIPERYLENE

Polymerization conditions: 50° C., 20 hrs., hexane solvent

| Run No. | Millimoles/100 g. | | | Yield, wt. percent | DSV, dl./g. |
|---|---|---|---|---|---|
| | TIBAL | CeOct | EADC | | |
| 1 | 5 | 0.25 | 0.25 | 49 | 5.1 |
| 2 | 10 | 0.25 | 0.25 | 85 | 4.8 |
| 3 | 20 | 0.25 | 0.25 | 90 | 3.8 |
| 4 | 10 | 0.50 | 0.50 | 81 | 4.5 |
| 5 | 20 | 0.50 | 0.50 | 91 | 3.7 |
| 6 | 10 | 1.0 | 1.0 | 70 | 4.1 |
| 7 | 20 | 1.0 | 1.0 | 91 | 3.4 |

In Run No. 2 the cis-1,4-content was 55, the trans-1,4 content was 44 and the 1,2-content was 1 percent; in Run No. 6 the cis-1,4 content was 52, the trans-1,4 content was 47 and the 1,2-content was 1. These microstructures were determined by infrared techniques.

EXAMPLE II

An example identical to that of Example I was run except diisobutylaluminum hydride (DIBAH) was employed instead of triisobutylaluminum. The results are reported in Table 2 below and the headings are the same as Table 1.

TABLE 2

Polymerization conditions: 50° C., 20 hrs., hexane solvent

| Run No. | Millimoles/100 g. | | | Yield, wt. percent | DSV dl./g. |
| --- | --- | --- | --- | --- | --- |
| | DIBAH | CeOct | EADC | | |
| 1 | 3.5 | 0.25 | 0.25 | 90 | 3.5 |
| 2 | 10.0 | 0.25 | 0.25 | 90 | 2.3 |
| 3 | 5.0 | 0.50 | 0.50 | 90 | ¹ND |
| 4 | 10.0 | 1.0 | 1.0 | 94 | 2.4 |

¹ Not determined.

In Run No. 1 the cis-1,4 content was 61, the trans-1,4 content was 37 and the 1,2-content was 2. In Run No. 2 the cis-1,4 content was 58, the trans-1,4 content was 41 and the 1,2-content was 1. The polymer prepared in Run No. 1 had a glass transition temperature ($T_g$) of $-46.5°$ C., as determined utilizing a differential scanning calorimeter.

EXAMPLE III

An example idential to that of Example I, except benzene was employed as the solvent instead of hexane, was conducted. The results and conditions are reported in Table 3.

TABLE 3—PROPERTIES OF POLYPIPERYLENE PREPARED IN BENZENE

Polymerization conditions: 50° C., 20 hrs., benzene solvent

| Run No. | Millimoles/100 g. piperylene | | | Yield, wt. percent | DSV dl. g. |
| --- | --- | --- | --- | --- | --- |
| | TIBAL | CeOct | EADC | | |
| 1 | 10 | 0.25 | 0.25 | 40 | ¹ND |
| 2 | 20 | 0.25 | 0.25 | 69 | 2.6 |
| 3 | 25 | 0.50 | 0.50 | 89 | 2.5 |
| 4 | 20 | 1.0 | 1.0 | 87 | 2.3 |

¹ Not determined.

In Run No. 1 the cis-1,4 content was 46, the trans-1,4 content was 53 and the 1,2-content was 1. In Run No. 3 the cis-1,4 content was 43, the trans-1,4 content was 56 and the 1,2-content was 1. The polymer prepared in Run No. 2 had a glass transition temperature ($T_g$) of $-50°$ C.

EXAMPLE IV

An experiment identical to that of Example II was conducted except benzene was used as a solvent instead of hexane.

TABLE 4

| Run No. | Millimoles/100 g. piperylene | | | Yield, wt. percent | DSV dl./g. |
| --- | --- | --- | --- | --- | --- |
| | DIBAH | CeOct | EADC | | |
| 1 | 3.5 | 0.25 | 0.25 | 63 | 2.6 |
| 2 | 7.5 | 0.25 | 0.25 | 74 | ¹ND |
| 3 | 5.0 | 0.50 | 0.50 | 85 | 2.4 |
| 4 | 10.0 | 0.50 | 0.50 | 97 | 1.6 |

¹ Not determined.

EXAMPLE V

A series of experiments was conducted at conditions identical to those used in Example I except that the mole ratio of the ethylaluminum dichloride to the cerium octoate catalyst was varid in this example. The results are reported in Table 5.

TABLE 5

Polymerization conditions: 50° C., 20 hrs., hexane solvent

| Run No. | Mmoles/100 g. monomer | | | Cl=Ce, atom ratio | Yield, wt. percent | DSV, dl./g. |
| --- | --- | --- | --- | --- | --- | --- |
| | TIBAL | CeOct | EADC | | | |
| 1 | 10 | 0.5 | 0.3 | 1.2:1 | 23 | ¹ND |
| 2 | 10 | 0.5 | 0.5 | 2.0:1 | 81 | 4.5 |
| 3 | 10 | 0.5 | 0.75 | 3.0:1 | 45 | 2.6 |

¹ Not determined.

While certain representative embodiments and details have been shown for the purpose of illustrating the invention, it will be apparent to those skilled in this art that various changes and modifications may be made therein without departing from the spirit or scope of the invention.

What is claimed is:

1. The process which comprises homopolymerizing at least one diolefin of the general formula:

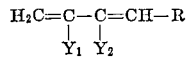

wherein $Y_1$ and $Y_2$ are selected from the group consisting of hydrogen and alkyl radicals having from 1 to 4 carbon atoms and R is selected from alkyl (including cycloalkyl), alkaryl, arylalkyl and aryl groups, containing from 1 to 8 carbon atoms, or copolymerizing said diolefin with at least one diolefin of the general formula:

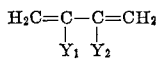

wherein $Y_1$ and $Y_2$ are selected from the group consisting of hydrogen and alkyl radicals having from 1 to 4 carbon atoms, by contact, under solution polymerization conditions with a catalyst comprising (1) an organoaluminum compound from the class consisting of triorganoaluminum and diorganoaluminum hydride compounds, (2) an organometallic compound, the metal ion of which is selected from the class consisting of metals of Group III–B of the Periodic System, and (3) a compound providing a halide ion selected from the group consisting of (1) hydrogen halides (2) alkyl, aryl, alkaryl, aralkyl and cycloalkyl metal halides wherein the metal is selected from Groups II, III–A and IV–A of the Periodic Table (3) halides of metals of Group III, IV, V, VI–B and VIII of the Periodic Table and (4) organometallic halides wherein the metal of the organometallic halide is selected from the group consisting of metals of Group III–B of Periodic Table having atomic numbers of 21, 39 and 57 through 71 inclusive, in which the mole ratio of the organoaluminum compound and the Group III–B metal compound is between about 2/1 and about 250/1 and when the halide ion is chloride, bromide or iodide, the mole ratio of halogen atom to Group III–B metal is between about 0.5/1 and about 4/1 and when the halogen is fluorine, the fluorine to Group III–B metal mole ratio is within the range of about 15/1 to about 80/1.

2. The process according to claim 1 in which piperylene is homopolymerized.

3. The process according to claim 1 in which 2,3-dimethyl-1,3-pentadiene is homopolymerized.

4. The process according to claim 1 in which 2-methyl-1,3-pentadiene is homopolymerized.

5. The process according to claim 1 in which piperylene and isoprene are copolymerized.

6. The process according to claim 1 in which piperylene and butadiene are copolymerized.

7. The process according to claim 1 in which the organoaluminum compound is triisobutylaluminum or diisobutylaluminum hydride.

8. The process according to claim 1 in which the organoaluminum compound and the Group III–B metal is between about 4/1 and about 100/1, and when the halide ion is chloride, bromide or iodide, the mole ratio of the halogen atom to the Group III–B metal is between about 1.2/1 to about 3/1 and when the halogen is fluorine, the fluorine to Group III–B metal mole ratio is between about 20/1 and about 70/1.

9. The process according to claim 1 in which the organometallic compound of Group IIIb is an organocerium compound.

10. The process according to claim 1 in which the compound providing a halide ion is one which provides a chloride ion.

References Cited

UNITED STATES PATENTS

| 2,999,087 | 9/1961 | Thomas et al. | 260—94.3 |
| 3,143,538 | 8/1964 | Robertson | 260—94.3 |
| 3,297,667 | 1/1967 | Von Dohlen et al. | 260—82.1 |
| 3,300,467 | 1/1967 | NaHa et al. | 260—94.3 |
| 3,301,839 | 1/1967 | NaHa et al. | 260—94.2 |
| 3,476,731 | 11/1969 | Cuzin et al. | 260—94.2 |

JOSEPH L. SCHOFER, Primary Examiner

R. A. GAITHER, Assistant Examiner

U.S. Cl. X.R.

252—429; 260—88.8, 93.5, 94.3